United States Patent [19]

Lew

[11] Patent Number: 4,729,407

[45] Date of Patent: Mar. 8, 1988

[54] DIGITAL CONTROL VALVE

[76] Inventor: Hyok S. Lew, 7890 Oak St., Arvada, Colo. 80005

[21] Appl. No.: 49,224

[22] Filed: May 13, 1987

[51] Int. Cl.$^4$ .......................... F16K 31/04; F16K 7/18
[52] U.S. Cl. .......................... 137/625.28; 251/129.05; 251/901
[58] Field of Search ................... 137/625.28; 251/901, 251/129.05

[56] References Cited

U.S. PATENT DOCUMENTS

| | | | |
|---|---|---|---|
| 2,548,333 | 4/1951 | Anderson | 137/625.28 X |
| 3,334,656 | 8/1967 | Boyle | 251/901 X |

FOREIGN PATENT DOCUMENTS 511459  9/1976  U.S.S.R. .............................. 251/901

*Primary Examiner*—Arnold Rosenthal

[57] ABSTRACT

This invention discloses a control valve comprising a plurality of circular cylindrical wall partitions separating a first compartment open to an inlet port from a second compartment open to an outlet port of the control valve, wherein each of the circular cylindrical wall partitions including a plurality of groups of holes disposed therethrough and arranged in an axially distributed pattern in groups is wrapped by the belt under tension provided by at least one idler roller disposed in an orbiting relationship about the central axis of the circular cylindrical wall partition, which belt covers up all of the groups of holes except one group when the idler roller is orbited to each of the predetermined positions about the circular cylindrical partitioning wall by a rotary actuator. A controller controlling the rotary actuators orbits the plurality of idlers respectively belonging to the plurality of individual control valves to different combinations of positions which provide different combinations of open holes disposed through the circular cylindrical wall partitions.

4 Claims, 3 Drawing Figures

4,729,407

DIGITAL CONTROL VALVE

BACKGROUND OF THE INVENTION

There are strong demands in the chemical and pharmaceutical industries for a flow control valve that provides precise and accurate control of fluid flow without contaminating the fluid medium flowing therethrough. It has been proven that a flow control valve operating in a digital manner, wherein the number of a plurality of fluid passage holes are either fully opened or fully closed, provides more accurate and reliable control compared with the conventional flow control valve comprising one large fluid passage that is partially opened or closed to control the fluid flow. The accurate and noncontaminating digital flow control valves must satisfy the following two conditions : Firstly, the plurality of fluid passage holes included in the digital flow control valve must be either completely closed without allowing any leak therethrough or fully opened. Secondly, the mechanical elements which close and open flow passage holes must not require any lubrication and should involve a minimum amount of rubbing whereby the closing and opening action of those mechanical elements produces zero amount of solid particles by abrasion. At the present time, a digital flow control valve satisfying the aforementioned mentioned two conditions is not available.

BRIEF SUMMARY OF THE INVENTION

The primary object of the present invention is to provide a digital flow control valve comprising a plurality of flow passage holes disposed through cylindrical wall partitions separating the upstream compartment from the downstream compartment, wherein belts covering up different numbers of the flow passage holes at different positions provide precise and accurate flow control.

Another object is to provide a digital control valve which does not require any lubrication and does not contaminate the fluid medium by shedding solid particles due to abrasion of valve parts under motion.

A further object is to provide a digital control valve wherein the plurality of the flow passage holes shut off by the belts are closed in a completely leak-proof manner and, consequently, the amount of the fluid flow through the digital flow control valve is determined accurately and precisely by the number and size of the fluid passage holes which are fully open.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
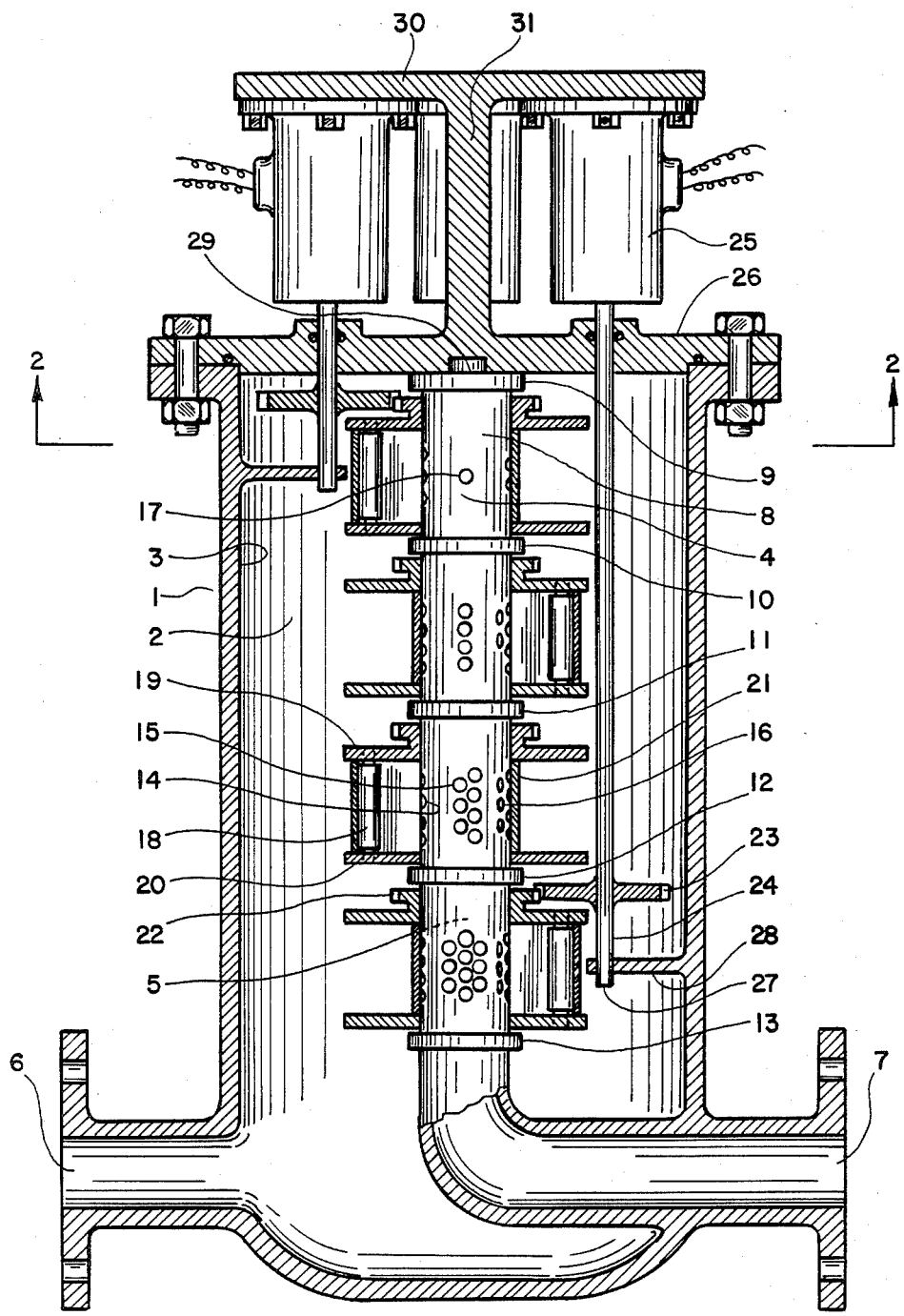
FIG. 1 illustrates a cross section of an embodiment of a digital flow control valve constructed in accordance with the principles of the present invention.

In FIG. 1 there is illustrated a cross section of an embodiment of the digital flow control valve constructed in accordance with the principles of the present invention. The control valve body 1 includes a first compartment or annular chamber 2 disposed intermediate the outer cylindrical vessel 3 and the inner cylindrical vessel 4 and a second compartment or cylindrical chamber 5 contained within the inner cylindrical vessel 4. The first compartment 2 includes a first port or inlet port 6, while the second compartment 5 includes a second port or outlet port 7. The circular cylindrical wall 8 of the inner cylindrical vessel 4 that separates the second compartment 5 from the first compartment 2 includes a plurality of collars 9, 10, 11, 12 and 13 disposed at regular intervals following the central axis of the circular cylindrical wall partition 8. The midportion of each section of the circular cylindrical wall partition 8 intermediate two adjacent collars includes a plurality of groups 14, 15, 16, etc., respectively comprising one or more flow passage holes such as the element 17, wherein the fluid passage holes belonging to each group of flow passage holes are disposed in an axially congregated pattern well separated from the flow passage holes belonging to adjacent groups. Each section of the circular cylindrical wall partition 8 intermediate two adjacent collars includes at least one idler roller 18 rotatably supported by a pair of annular discs 19 and 20 rotatably mounted on the circular cylindrical wall partition 8 adjacent to the pair of collars 11 and 12. Each of the pluralities of belts 21 enveloping the combination of each section of the circular cylindrical wall partition 8 and the idler 18 rotatably disposed adjacent thereto covers up all groups of the fluid passage holes at the shut-off position or covers up all groups except one group at an open position. One of each pair of the circular discs supporting the idler roller therebetween includes a ring gear 22 affixed thereto in a coaxial relationship. The ring gear 22 is engaged by an actuator gear 23 nonrotatably mounted on an actuator shaft 24 extending from a rotary actuator 25, wherein the actuator shaft 24 extends through the end plate 26 of the outer cylindrical vessel 3 in a leak-proof manner and extends into the first compartment 2 in a parallel and off-set relationship with respect to the central axis of the circular cylindrical partitioning wall 8. The extremity 27 of the actuator shaft 24 is rotatably secured by a bearing affixed to a bracket 28 extending from the cylindrical wall of the outer cylindrical vessel 3. The closed extremity 29 of the inner cylindrical vessel 4 is secured to the end plate 26. The rotary actuators are secured to a holder plate 30 affixed to a post 31 extending from the end plate 26.

Figure 2:
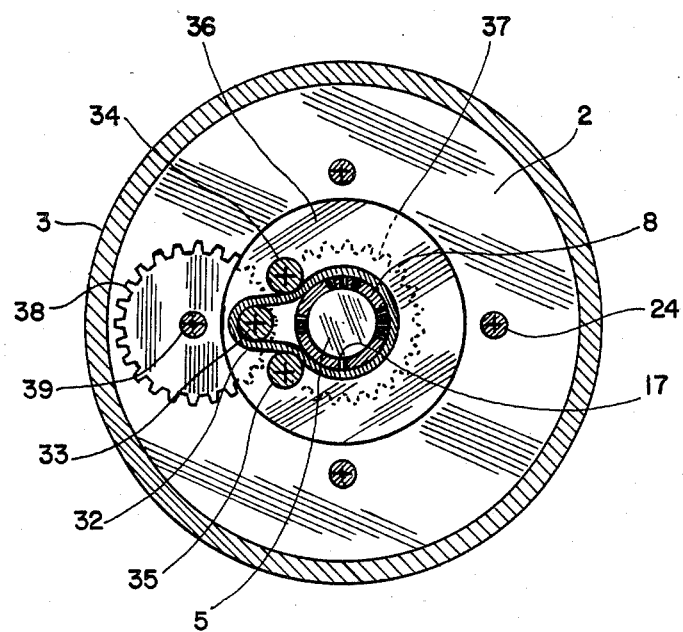
FIG. 2 illustrates another cross section of the embodiment shown in FIG. 1.

In FIG. 2 there is illustrated another cross section of the embodiment shown in FIG. 1, which cross section is taken along plane 2-2 as shown in FIG. 1. The belt 32 enveloping the combination of a section of the circular cylindrical wall partition 8 and the idler 33 may include a pair of pinching idlers 35 disposed externally to the belt 32 and rotatably secured to the pair of the circular discs 36 and another that does not appear in this cross section view. The ring gear 37 coaxially affixed to the circular disc 36 is engaged by an actuator gear 38 nonrotatably mounted on a actuator shaft 39. The particular embodiment illustrated in FIGS. 1 and 2 comprises four belt valves respectively controlled by four rotary actuators. It is clear that the digital flow control valve of the present invention may include any number of belt valves in the range of one to a plurality of units depending on the operating requirements and design preferences. Of course, a flow control requiring a very wide range of control may employ a parallel combination of a plurality of the individual control valves shown in FIGS. 1 and 2 wherein the first and second compartments included in the plurality of the individual control valves are connected to a common inlet and outlet ports, respectively. The plurality of the rotary actuators respectively controlling the plurality of the belt valves included in the embodiment shown in FIGS. 1 and 2 are controlled by a controller that selects the different combinations of the open flow passage holes ranging from zero to the maximum number of open flow passage holes.

Figure 3:
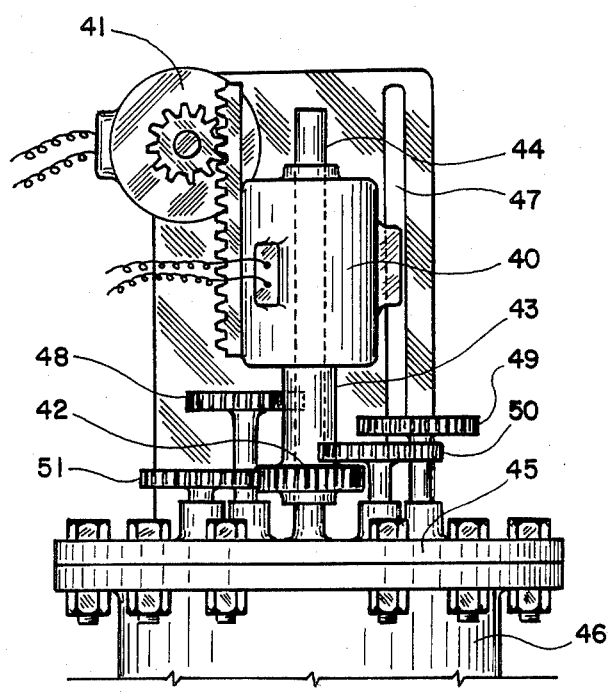
FIG. 3 illustrates an embodiment of the rotary actuator usable in conjunction with the digital flow control valve of the present invention.

In FIG. 3 there is illustrated an embodiment of the rotary actuator usable in conjunction with the digital flow control valve of the present invention, which rotary actuator embodiment is different from that included in the digital flow control valve shown in FIG. 1. This embodiment includes two drive units 40 and 41 which may be electric servo motors or hydraulic rotary actuators with rotary encoder. The drive unit 40 with a drive gear 42 has a hollow shaft 43 that is engaged by a circular cylindrical post 44 extending from the end plate 45 of the control valve body 46. The slide guide 47 prevents the drive unit 40 from rotating, while it is allowed to slide in the axial direction. The drive unit 41 controls the axial positions of the drive unit 40, wherein the drive gear 42 engages one of the plurality of the actuator gears respectively mounted on the actuator shafts controlling different belt valves included in the digital flow control valve as described in conjunction with FIGS. 1 and 2. The two drive units 40 and 41 are controlled by a controller which coordinates the actions by the two drive units.

While the principles of the present invention have now been made clear by the illustrative embodiments, there will be immediately obvious to the skilled in the art many modifications of the structures, arrangements, proportions, elements and materials which are particularly adapted to the specific working environments and operating conditions in the practice of the invention without departing from these principles.

I claim:

1. An apparatus for controlling fluid flow comprising in combination:
   (a) a first compartment including a first port and a second compartment including a second port enclosed without a body of the apparatus, wherein said first and second compartments are separated from one another by a cylindrical wall partition;
   (b) a plurality of groups of flow passage holes disposed through said cylindrical wall partition, wherein each of said groups of flow passage holes includes one or more flow passage holes disposed in an axially congregated pattern whereby two adjacent groups of flow passage holes are separated by a solid portion of the cylindrical wall partition having a sizable circumferential dimension;
   (c) an idler roller disposed adjacent to said cylindrical wall partition in a parallel relationship wherein said idler roller is rotatable about its own axis and orbitable about the central axis of said cylindrical wall partition;
   (d) at least one belt enveloping the combination of said cylindrical wall partition and said idler roller wherein said belt covers up all of the flow passage holes when said idler roller is orbited to a shut-off position of the apparatus or said belt covers up all of the flow passage holes except the flow passage holes belonging to one group of flow passage holes adjacent to said idler roller when said idler roller is orbited to an open position of the apparatus; and
   (e) means for orbiting said idler roller to and holding at shut-off or open positions.

2. The combination as set forth in claim 1 wherein said combination includes a pair of pinching idler rollers orbiting with said idler roller wherein said pair of pinching idler rollers disposed externally to said belt in a generally symmetric arrangement about a plane including the central axis of said cylindrical wall partition and said idler roller provide a greater wrap angle of said belt around said cylindrical wall partition.

3. An apparatus for controlling fluid flow comprising in combination:
   (a) a first compartment including a first port and a second compartment including a second port enclosed within a body of the apparatus, wherein said first and second compartment are separated from one another by a cylindrical wall partition divided into a plurality of subsections;
   (b) a plurality of groups of flow passage holes including in each of said subsections of the cylindrical wall partition, wherein each of said groups of flow passage holes includes one or more flow passage holes disposed through said cylindrical wall partition in an axially congregated pattern whereby two adjacent groups of flow passage holes are separated by a solid portion of the cylindrical wall partition having a sizable circumferential dimension;
   (c) a plurality of idler rollers respectively disposed adjacent to each of said subsections of the cylindrical wall partition in a parallel relationship wherein each of said idler rollers is rotatable about its own axis and orbitable about the central axis of said cylindrical wall partition;
   (e) a plurality of belts respectively enveloping each combination of said subsections of the cylindrical wall partition and said idler rollers, wherein each of said belt covers up all of the flow passage holes included in each of said subsections when said idler roller is orbited to a shut-off position of said subsection or said belt covers up all of the flow passage holes except the flow passage holes belonging to one group adjacent to the idler roller of said subsection when said idler roller is orbited to an open position of said subsection and
   (f) a plurality of means for respectively orbiting each of said plurality of idler rollers to and holding at shutoff or open positions.

4. The combination as set forth in claim 3 wherein each subsection of said cylindrical wall partition includes a pair of pinching idler rollers orbiting with the idler roller of said each subsection, wherein said pair of pinching idler rollers disposed externally to the belt enveloping the combination of said subsection and said idler roller in a generally symmetric arrangement about a plane including the central axes of said subsection and said idler roller provide a greater wrap angle of said belt around said subsection of the cylindrical wall partition.

* * * * *